(12) United States Patent
Fredrickson (10) Patent No.: US 8,375,997 B2
(45) Date of Patent: Feb. 19, 2013

(54) PASTING APPARATUS AND METHOD

(75) Inventor: Roy A. Fredrickson, Bridgman, MI (US)

(73) Assignee: MAC Engineering and Equipment Company, Inc., Benton Harbor, MI (US)

( * ) Notice: Subject to any disclaimer, the term of this patent is extended or adjusted under 35 U.S.C. 154(b) by 0 days.

(21) Appl. No.: 13/544,499

(22) Filed: Jul. 9, 2012

(65) Prior Publication Data

US 2012/0282393 A1 Nov. 8, 2012

Related U.S. Application Data

(62) Division of application No. 12/100,105, filed on Apr. 9, 2008, now Pat. No. 8,272,408.

(51) Int. Cl.
*H01M 4/64* (2006.01)

(52) U.S. Cl. ............................. 141/1.1; 141/32

(58) Field of Classification Search .................... 141/1.1, 141/32
See application file for complete search history.

(56) References Cited

U.S. PATENT DOCUMENTS

| | | | |
|---|---|---|---|
| 1,688,369 A | 10/1928 | Willard | |
| 2,555,301 A | 6/1951 | Chubb | |
| 3,772,084 A | 11/1973 | Schoelle | |
| 3,894,886 A | 7/1975 | Pankow et al. | |
| 4,004,945 A | 1/1977 | Smith et al. | |
| 4,050,482 A | 9/1977 | Ching et al. | |
| 4,342,343 A | 8/1982 | Clague et al. | |
| 4,499,929 A | 2/1985 | Shima et al. | |
| 4,606,383 A | 8/1986 | Yanik | |
| 4,878,521 A * | 11/1989 | Fredrickson | 141/1.1 |
| 4,878,522 A | 11/1989 | Ostrander | |
| 4,932,443 A | 6/1990 | Karolek et al. | |
| 5,302,476 A | 4/1994 | Kao et al. | |
| 5,467,805 A | 11/1995 | Farina | |
| 5,682,928 A | 11/1997 | Keith | |
| 5,776,209 A | 7/1998 | Fauteux et al. | |
| 5,800,946 A | 9/1998 | Grosvenor et al. | |
| 6,077,623 A | 6/2000 | Grosvenor et al. | |
| 6,531,248 B1 | 3/2003 | Zguris et al. | |
| 6,949,313 B2 | 9/2005 | LaFollette | |

FOREIGN PATENT DOCUMENTS

IT    1304200    3/2001

* cited by examiner

*Primary Examiner* — Gregory Huson
*Assistant Examiner* — Nicolas A Arnett
(74) *Attorney, Agent, or Firm* — Barnes & Thornburg LLP (57) ABSTRACT

An apparatus and method operations are provided for battery plate fabrication, in particular for applying paste to battery plate grids. A conveyer-type pasting machine includes a conveyer belt for moving battery plate grids under a new type of paste dispensing hopper, which includes closely spaced knurled rollers and an angled paste deflector member, which cooperate to generate a pressurized stream of paste for extrusion thru the battery plate grid. The apparatus also includes a specialized grid support sheet that also enables a consistent layer of paste to be applied to both exterior sides of a manufactured battery plate grid by enabling application of paste to one side of the grid and facilitating transmission of the paste through to and past the opposite, exterior side of the grid.

11 Claims, 7 Drawing Sheets

PASTING APPARATUS AND METHOD

CROSS REFERENCE TO RELATED APPLICATIONS

This application is a Divisional of copending U.S. patent application Ser. No. 12/100,105, filed Apr. 9, 2008. The disclosure set forth in the referenced application is incorporated herein by reference in its entirety.

BACKGROUND

The invention relates to electrical battery plate manufacturing. More specifically, the invention relates to manufacturing equipment and methodologies for the application of lead oxide paste or the like to grids that then form battery plates inside an electrical battery.

Conventional paste applying systems apply lead oxide paste to a lead grid or matrix that defines the resulting battery plate and supports the disposed lead oxide paste. Such conventional systems may use a conveyor-type paste supply technique, wherein a paste supplying system includes a hopper that dispenses the lead oxide paste onto grids moving along the conveyor underneath the hopper. Alternatively, in a drum apparatus version of such a conventional paste applying system, a drum moves such lead grids proximate to a hopper for dispensing the lead oxide paste onto the grid.

In an illustrated embodiment, an apparatus and method are provided for use in a battery plate fabrication system for applying lead oxide paste to a battery plate grid wherein paste may be applied to both sides of the battery plate grid by applying paste to one side of the grid and facilitating forming of the paste through to the opposite side of the grid.

Additional features will become apparent to those skilled in the art upon consideration of the following detailed description of drawings exemplifying the best mode as presently perceived.

BRIEF DESCRIPTION OF THE DRAWINGS

The description particularly refers to the accompanying figures in which.

DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

Conventionally, "orifice-type" pasting machines were used to dispose "over-paste" (wherein the outer side of the grid wires are completely covered with paste) on both the top and the bottom side of a battery plate grid. An orifice-type paster uses a set of rollers to drive the battery plate grid between two steel plates that form an orifice. Within this orifice, battery paste is dispensed into the grid and residual paste is wiped on the bottom side of the grid with a roller.

However, such orifice-type pasting machines suffer from a conventional problem in that the manufacturing of a large number of battery plates is difficult and time consuming because the grid can be destroyed by particles in the paste, or by the grid becoming jammed between the steel plates.

Alternatively, conventional "conveyer-type" pasting machines may use a conveyer belt to convey a battery plate grid under a hopper that dispensed a lead oxide paste into the grid. Subsequent to the paste being applied to the grid, the paste would be packed into the grid with the top side of the grid wires completely covered with paste, i.e., "over-paste;" however, the bottom side of the grid, which is in contact with the conveyer belt, is often not totally covered with the lead oxide paste. Nevertheless, the advantage of a conventional conveyer-type pasting machine over an orifice-type pasting machine remains that battery plate grids are less prone to being jammed in conveyer-type pasting equipment. Moreover, the small particles included in the paste tend to have less of an adverse affect on the grid.

Accordingly, illustrated embodiments provide an apparatus and method for use in a battery plate fabrication system for applying paste to battery plate grids. In illustrated embodiments, a conveyer-type pasting machine includes a conveyer belt for moving battery plate grids under a hopper to enable disposition of paste on battery plate grids. A consistent layer of paste may be applied to both sides of the battery plate grid by applying paste to one side of the grid and facilitating transmission of the paste through to and past the opposite, exterior side of the grid. As a result, over-paste is provided on both exterior sides of the grid.

In illustrated embodiments, a conveyer-type pasting machine is provided with a new type of paste dispensing hopper, which includes closely spaced knurled rollers and an angled paste deflector member, which cooperate to generate a pressurized stream of paste for extrusion thru the battery plate grid.

Figure 1:
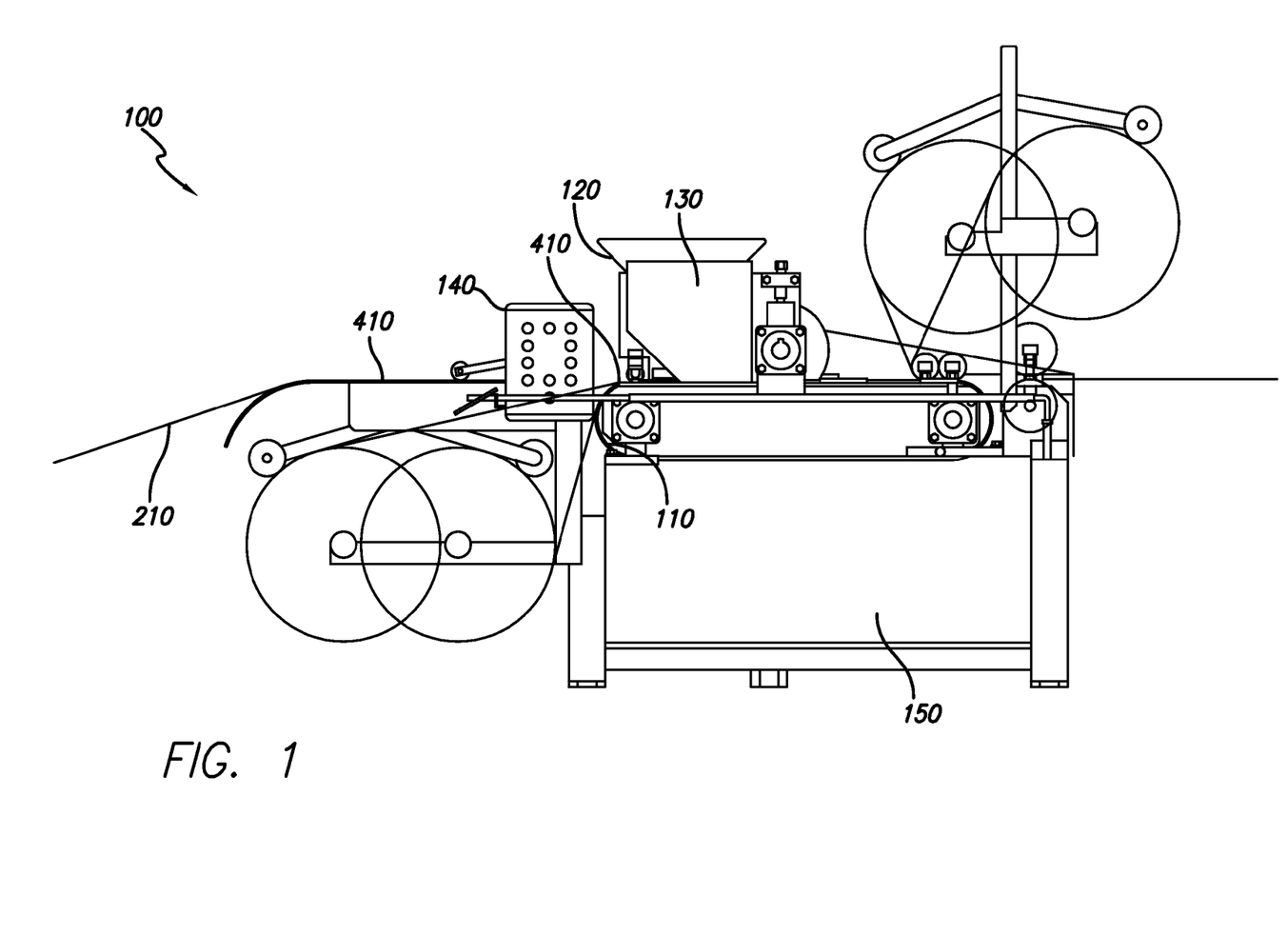
FIG. 1 is a side view of various components of the pasting machine including a conveyer belt and a specialized hopper for dispensing paste in accordance with illustrated embodiments.

As illustrated in FIG. 1, the pasting machine 100 includes a conveyer belt 110 and a paste dispensing mechanism or hopper 120 for dispensing battery paste 130. The conveyer belt 110 is operated under the power of one or more motors 150.

Figure 2:
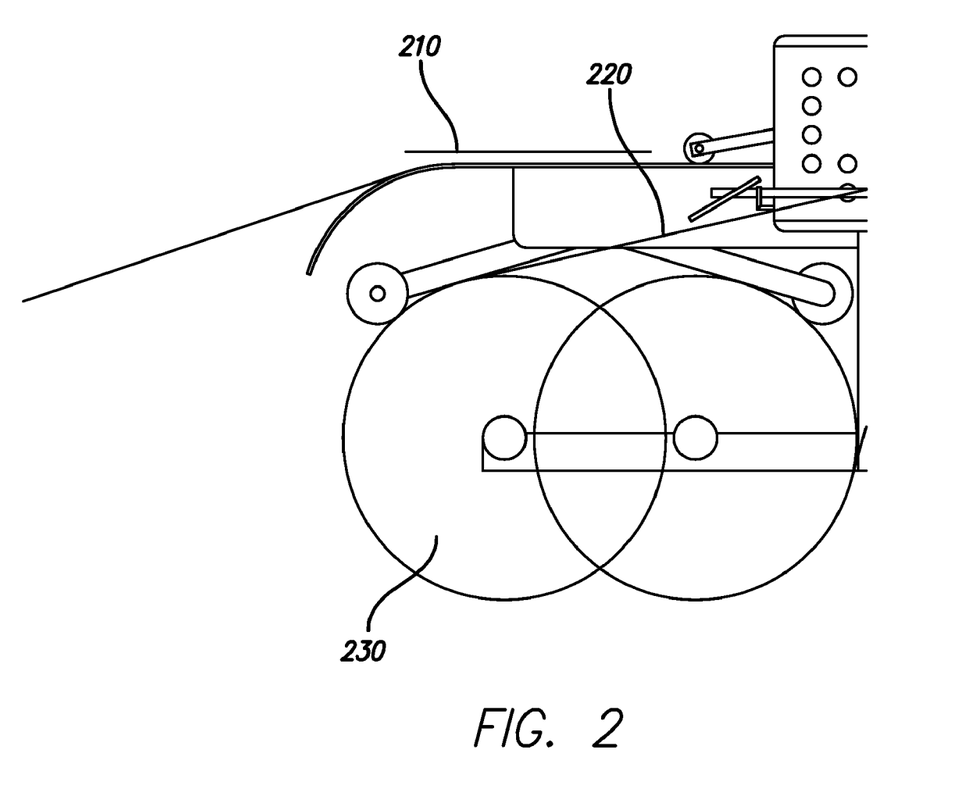
FIG. 2 is a side view of a conveyer belt and lower paper rolls provided in accordance with illustrated embodiments.

As illustrated in FIG. 2, battery grid plates 210 are fed into the machine 100 in a generally continuous strip so as to receive battery paste 130 thereon. Thus, the grid material 210 is generally a continuous strip form conveyed through the machine 100 by means of the conveyer belt 110, which may be implemented as a flexible or fabric belt material. The grid material 210 is carried on the conveyor belt 110 to continuously, inline-process grids 210 by dispensing battery paste 130 on the plates 210.

Figure 3:
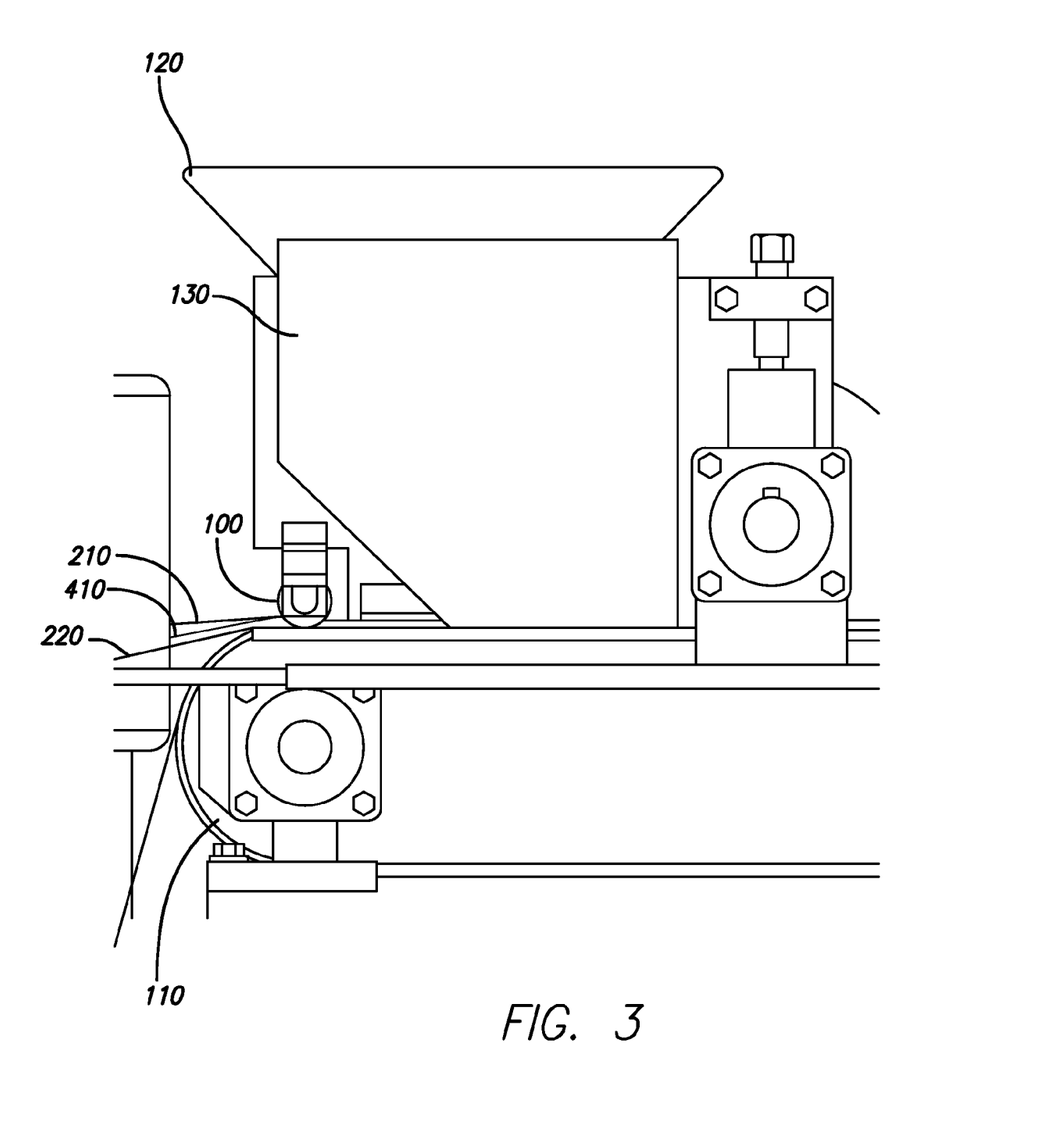
FIG. 3 is a side view of a specialized hopper for dispensing paste in accordance with illustrated embodiments.

In operation of the machine 100, a ribbon of grid material 210 is fed into the apparatus 100 beneath the hopper 120. Additionally, as illustrated in FIGS. 2 and 3, a paper strip 220 may be fed into the apparatus 100 by operation of one or more lower rolls of backing paper 230. This paper strip 220 may be fed between a bottom side of the grid material 210 and the top side of the conveyor belt 110, as illustrated in FIG. 4.

Figure 4:
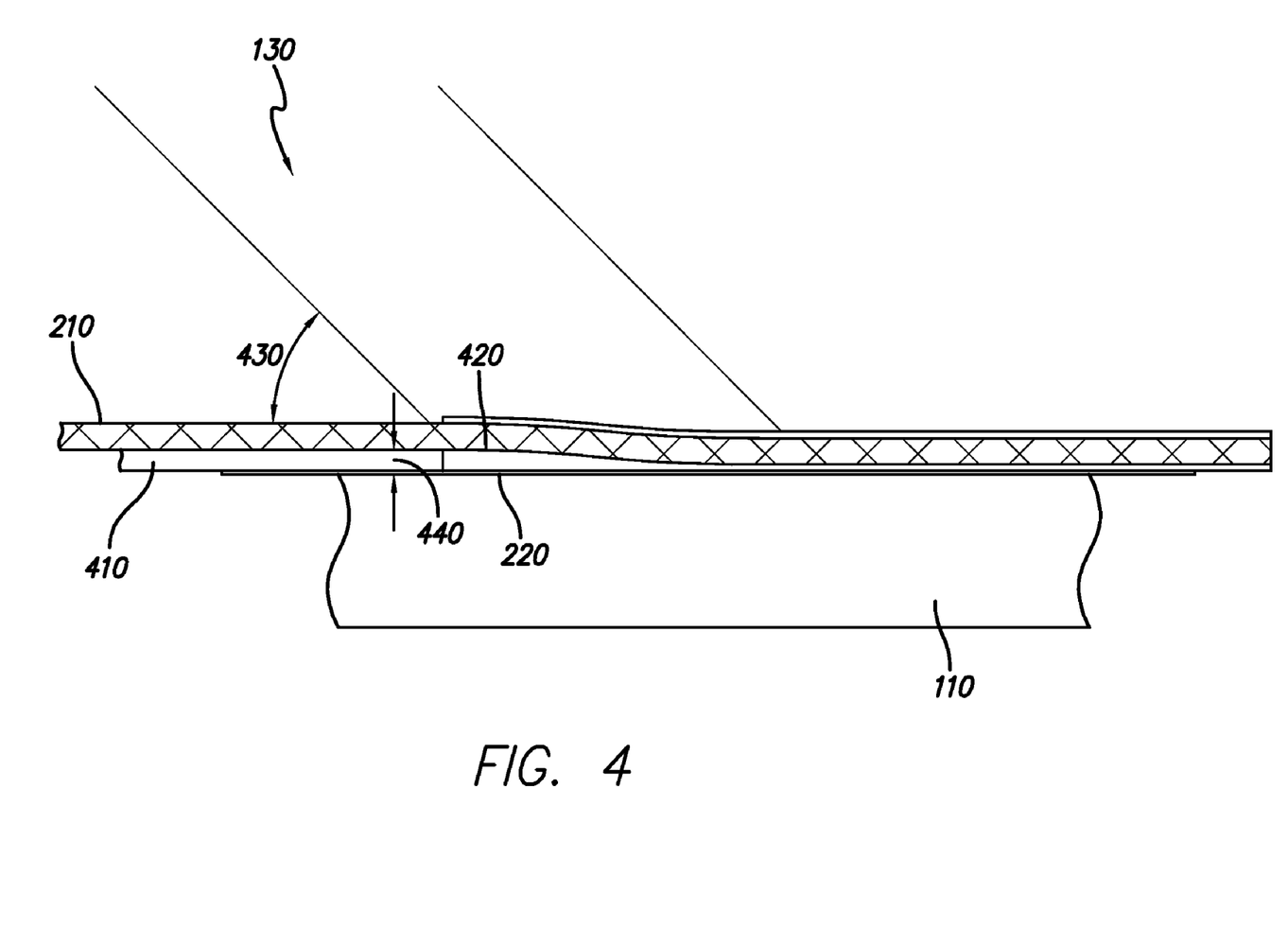
FIG. 4 illustrates additional details of a grid support sheet interacting with a battery plate grid and a conveyer as provided for in accordance with illustrated embodiments.
Figure 5:
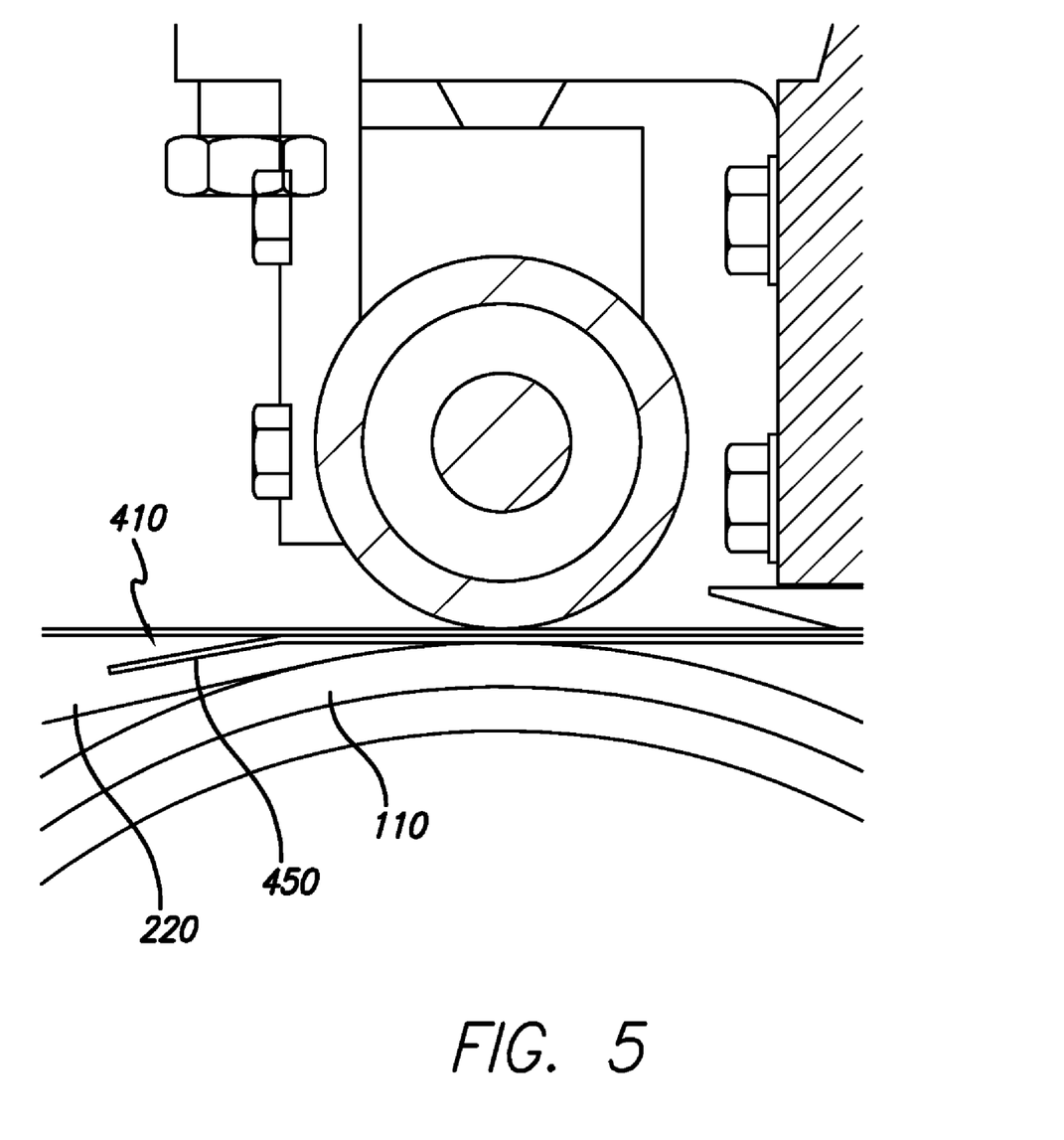
FIG. 5 illustrates further details regarding the functionality of a grid support sheet provided in accordance with at least one illustrated embodiment.

As the ribbon of grid material 210 is fed beneath the hopper 120, the material 210 is lifted slightly by a grid support sheet 410, as illustrated in FIG. 4. Thus, it should be understood that the conveyor belt 110 may be implemented in part or provided in connection with a grid support sheet 410 mounted on top so as to interact with conveyor belt 110 and support the grid material 210 up off the belt 110 by some degree 430 or distance 440 (see FIGS. 4 and 5) in the area where a pressurized paste stream is extruded out of the hopper 120.

In implementation, the grid support sheet 410 may be implemented as a thin steel sheet attached over the conveyer belt 110 conveying the grid material 210, sized and positioned precisely to support the grid material 210 and defining a gap 440 while paste 130 is extruded thru the grid 210 allowing paste 130 to wrap around or flow through to the bottom side of the grid 210. A leading edge 450 of the support sheet 410 (see FIG. 5) is angled to facilitate a smooth transition of the grid ribbon 210 into the apparatus. This leading edge 450 can be some what flexible to accommodate variations in the material 210 and prevent jamming.

Moreover, the thickness 440 of the grid support sheet 410 may be significant in that selecting a proper thickness is at least partly determinative for the proper amount of paste 130 to be applied to the bottom side of the grid 210.

Further, the shape of the grid support sheet 410 may be significant in that the shape may prevent grid material 210 from being jammed between the support sheet 410 and the hopper 120. For example, a transition ramp or beveled portion 420 helps to transition the plate 210 coated with paste 130 from a slightly elevated position 440 to upstream of the hopper 120 to the more inline position generally downstream of the hopper 120. Moreover, this shape of the grid support sheet 410 and the ramp 420 may be selected so as to assist in preventing the lower backing paper 220, which may be optionally applied to the bottom of the grid 210, from jamming on the grid support sheet 410.

As illustrated in FIG. 4, the grid support sheet 410 may be formed with the leading edge 450 or ramp 420 that is slightly beveled at a downward angle. This downward inclination of the grid support sheet 410 may prevent or hinder lugs attached to the grid material 210 from becoming caught on the grid support sheet 410. If the lugs were to be caught on the support sheet 410, the grid 210 could become misaligned or jammed in the machine 100. It should be appreciated also that the ramp 420 on the trailing edge or downsteam side of the support sheet 410 may be tapered generally in the area of the outlet from the hopper 120.

In various alternative implementations, the thickness dimension of the support sheet 410 and use of the paper 220 may facilitate controlled dispensing of paste 130 onto and through the grid 210 for engagement with the underlying paper 220. As suggested above, the separation provided by the thickness 440 dimension of the support sheet 410 may assist in control of the thickness of paste extruded to the underside of the grid 210.

As illustrated in FIG. 4 the paper strip 220, grid material 210 and paste 130 may be brought together at the outlet of the hopper. To implement this combination, paste 130 is dispensed into the openings of the grid 210 and applied to the top surface of the grid material 210 and a portion of the paste 130 is extruded through the openings of the grid 210 towards the bottom side of the grid 210. By interaction with the grid support plate 410, the momentary gap 440 may be provided between the bottom side of the grid material 210 and the paper 220, thereunder, to allow the extruding paste 130 to flow into the openings in the grid material 210 through to the underside of the grid 210. Thus, the paper 220 may cover the paste 130 extruded to the underside of the grid 210 and may be generally attached or otherwise carried thereon.

Figure 6:
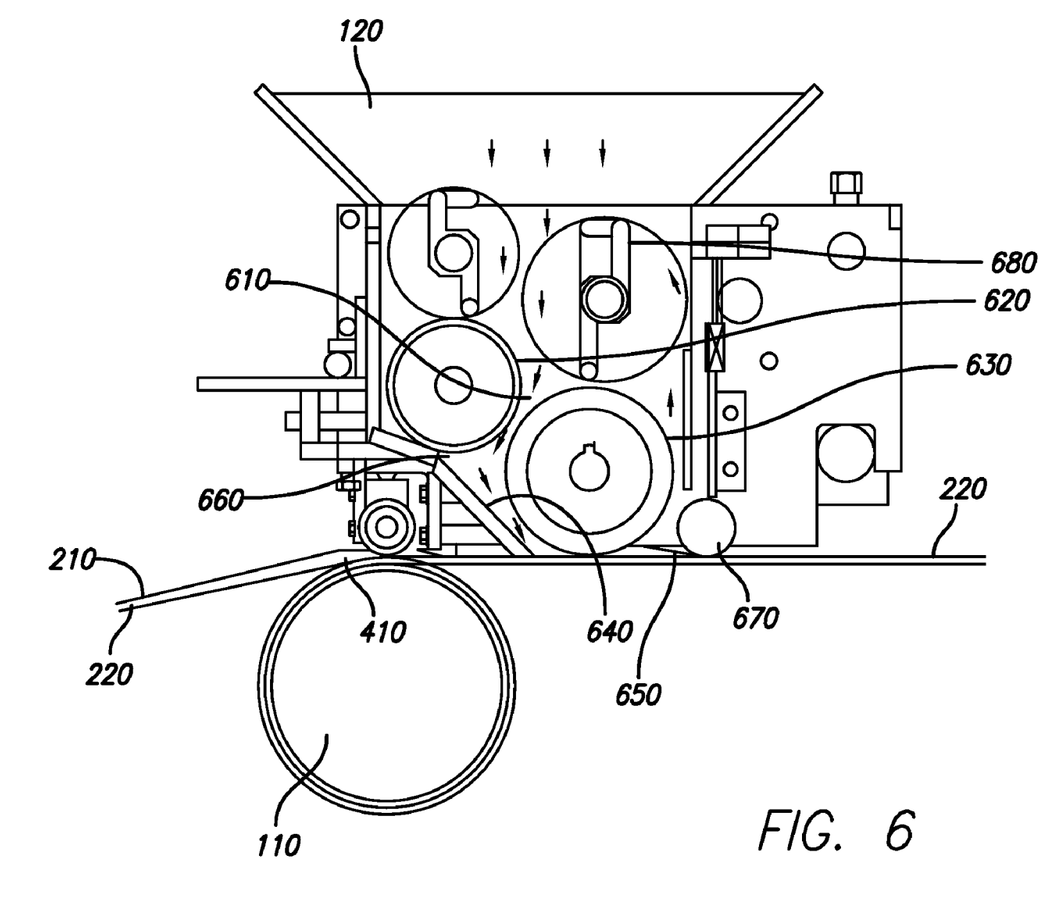
FIG. 6 illustrates additional details of a hopper designed in accordance with at least one illustrated embodiment.

As illustrated in FIG. 6, the hopper 120 is used to dispense battery paste 130 onto the battery plate grid 210 as the battery plate grid material 210 is in proximate spaced relationship to the hopper 120. Thus, as a battery plate grid 210 moves below the hopper 120 and the battery plate grid 210 is carried by the conveyer belt 110, the hopper 120 extrudes battery paste 130 along path 610 onto the battery plate grid 210.

The hopper 120 is provided above the conveyor belt 110 for controllably dispensing paste 130 onto the grid material 210 conveyed thereunder. As illustrated in FIG. 6, the hopper structure including a hopper bin and mixing arms is generally of known construction. However, the outlets from the hopper, including dispensing mechanisms, provide new functionality.

More specifically, the hopper 120 may include two knurled rollers 620, 630 positioned parallel to each other, spaced a specific distance apart so as to pressurize battery paste sufficiently to extrude it out of the hopper 120 as a pressurized stream 130. The knurled surfaces are provided to engage the paste 130 and draw it between the rollers 620, 630. These rollers 620, 630 rotate in opposition such that the primary roller 620 rotates clockwise and the secondary roller 630 is rotated counterclockwise to draw a stream or layer of lead oxide through the gap between the rollers 620, 630. The specific distance between the two knurled rollers 620, 630 is significant in that, if spaced too close together, the paste 130 will not feed so as to be extruded from the hopper 120. Alternately, if the two knurled rollers 620, 630 are spaced too far apart the paste 130 will not have sufficient pressure applied to it so as to extrude properly.

As illustrated in FIG. 6, one or more paste masking shoes 650 may also be positioned on the outward edges of the support sheet 410 formed to receive an edge of the support sheet 410. Such shoes 650 and their interaction with the support sheet 410 may assist in providing side-to-side stability to the sheet 410 and prevent extrusion of paste 130 generally outwardly of the apparatus 100.

As illustrated in FIG. 6, the hopper 120 may also include a scraping member 660 for scraping the paste off the primary knurled roller 620, which results in pressurizing the paste and forcing the paste out of the bottom of the hopper 120. Such a member 660 may be implemented as a plate, grate or the like acting as a stop preventing some or all of paste carried by the primary knurled roller 620 from being separated therefrom. Thus, the scraping member 660 is provided to help remove at least a portion of the paste 130 that builds up on the primary roller 620.

The knurling on the rollers 620, 630 may be generally linear and parallel to the axis of rotation. Thus, a cross-section of the knurl marks may provide, for example, that the knurling is a v-shaped groove. Such a v-shaped groove may, in some circumstances, assist in reducing the retention of the paste 130 on the surface of the rollers 620, 630. A third roller 670 may also be provided to interact with the grid 210 following application of the past 130 to assist in flattening, pressing, and otherwise working the paste 130 applied to the grid 210 and assist in returning any excess paste 130 to the hopper 120.

Returning to FIG. 4, in accordance with at least one illustrated embodiment, the pressurized paste may be channeled out of the hopper 120, at an angle 430, e.g., approximately 45 degrees to the grid 210 being filled so as to extrude a battery paste strip 130 into and thru the grid 210. The extrusion of the paste at the angle 430 to the grid 210 aids in propelling the grid 210 in the direction of production, i.e., in the direction of movement of the conveyer-belt. As a result, added utility may be provided by providing such an angle 430 in that the likelihood of a battery plate grid 210 jamming under the hopper 120 may be reduced.

As illustrated in FIG. 6, the hopper 120 may also or alternatively include a baffle plate 640, which may be configured so as to channel the pressurized paste stream out of the hopper 120 and into the grid 210 to be filled with paste 130. As understood by one of ordinary skill in the art, the baffle plate 640 may assist in providing the angled pressurized past stream illustrated in FIG. 4.

The plate 640 cooperates with the two knurled rollers 620, 630 to generate the pressurized paste stream for extrusion thru the battery plate grid 210. The relationship, e.g., angle, between the bottom of the baffle plate 640 of the hopper 120, and the trailing edge 420 of the grid support sheet 410 may be significant in that proper selection of such an angle enables some of the extruded paste included in the pressurized paste steam to be forced thru the grid 210 and totally cover the bottom surface of the battery plate grid 210 before the grid is allowed to rest onto the conveyor belt 110; thus, the angle may be significant in properly generating "over-paste " on the bottom surface as well as the top surface of the battery plate grid material 210.

The plate 640 may be positioned relative to the conveyor belt 110 at an angle of approximately 45 degrees. Theoretically, an angle of 90 degrees would not be acceptable; however, a variety of angles of the plate 640 relative to the conveyor belt 110 may be used. The choice of angle may depend upon the viscosity of the paste 130, the rate of travel of the conveyor belt 110, surface characteristics of the grid material 210 and the interaction between the paste 130 and the grid material 210, as well as other variables.

However, the angle at which the baffle plate 640 is positioned is such that the baffle plate 640 does not allow any pressure from the pressurized paste stream 230 to push the grid 210 against the support sheet 410 until the grid 210 is positioned directly over the trailing edge of the support sheet 410. This configuration may enable a reduction in the friction of the battery plate grid 210 on the support sheet 410, resulting in a reduction of jamming of grids 210 under the hopper 120.

The position of the grid support sheet 410, in relation to the angled baffle plate 640 inside the paste dispensing hopper 120 may be significant in that proper positioning may be at least partially determinative in ensuring that the paste 130 flows thru the grid 210 to be deposited on the bottom side of the grid 210.

Although not illustrated, the paste dispensing hopper 120 may also incorporate masking plates attached to the bottom of the hopper to mask off portions of the grid 210 to prevent the pressurized paste stream from being extruded into areas that should not have paste applied to them. These plates may be designed in such a way to allow sufficient but not unnecessary clearance space for the grid 210 to pass over the grid support sheet 410 without jamming. An angle of the exit end of the relief cut in such masking plates attached to the bottom of the paste dispensing hopper 120 may be such that it directs the grid 210 over the trailing edge of the grid support sheet 410, allowing the battery paste 130 to be extruded into the grid 210 without allowing the pressurized paste stream 230 to squirt out the sides of the masking plates.

In at least one illustrated embodiment, the exit end of the baffle plate 640, inside the hopper 120, may be designed to fit between the grid masking plates attached to the bottom of the paste dispensing hopper 120. Such a configuration may aid in directing the paste 130 into the grid 210 and assist in preventing pressurized paste 230 from being extruded into the relief cut in the paste masking plates, for the grid support sheet 410.

In operation, the primary and secondary rollers 620, 630 may be operated to draw paste 130 into the pressurized paste path 610 for pressurized dispensing of paste 130 onto a grid 210 conveyed underneath the hopper. The grid 210 is positioned on top of the grid support sheet 410 and advanced underneath the hopper 120. The angle 430 of dispensing the pressurized paste into the grid helps provide some degree of force downwardly on the grid as it is conveyed underneath the hopper and a forward advancing component as a result of the pressure.

As the grid 210 may not actually be in contact the conveyor belt 110 prior to dispensing of the paste 130 thereon, the directional flow of the paste 130 against the grid 210 helps promote movement of the grid through the apparatus. As paste 130 is dispensed onto the grid 210 and extruded onto the top side and through the openings in the grid 210, a portion of paste 130 is allowed to flow through the grid to the bottom side. The portion of paste extruded to the bottom side contacts the underlying paper provided in the inline process.

The grid support 410 provides support for the grid 210 and separation 440 between the grid 210 and lower paper 220. By providing a separation or gap 440 between the paper lower 220 (or alternatively, the conveyer belt 110 if no paper is used) and underside of the grid 210, a portion of paste 130 can more easily extrude to the underside of the grid 210 conveyed along the path through the apparatus 100. Thus, the gap 440 provided by the dimensions and structures associated with the grid support sheet 410, shoes 650, and components of the outlet of the hopper 120 provides a consistent application of a layer of paste to the underside of the grid 210. The ramp 420 helps transition the elevated grid 210 with applied paste 130 to transition to an unelevated position generally downstream of the hopper 120.

As a result of the various combination of components illustrated in FIGS. 1-6, in illustrated embodiments, the pasting machine 100 produces battery plates with over-paste on both the top and bottom sides of a manufactured plate, while maintaining the utility provided by conventional conveyer-type pasting machines, e.g., relatively high production rates.

Figure 7:
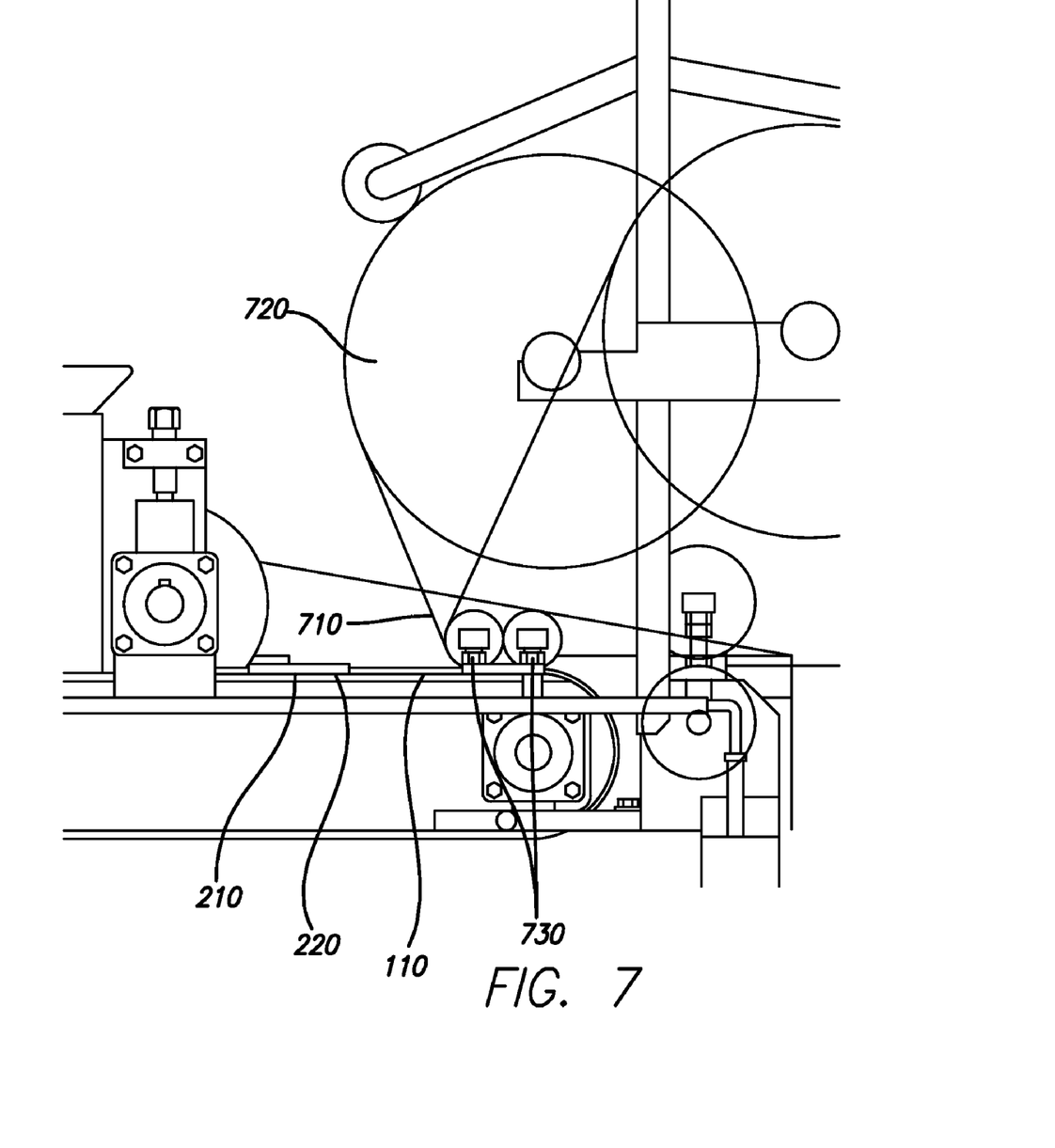
FIG. 7 illustrates is a side view of a conveyer belt and upper paper rolls provided in accordance with illustrated embodiments.

As illustrated in FIG. 7, downstream from a station for dispensing of the paste 130 and application of the bottom disposed paper strip 220. As illustrated in FIG. 7, an optional top paper strip 710 (provided by top paper rolls 720 and rollers 730, which are proximate to the conveyer belt 110) may be applied to the top portion of the battery plate grid 210. Thus, it should be appreciated that, in illustrated embodiments, the grid 210, paste 130, and underside paper strip 220 may be brought together generally proximate to the outlet of the hopper 120. Subsequently, at a distance downstream from that point, the top paper 710 may be applied. Further, although not illustrated, after the paper strip 710 is applied, the resulting combination of paper 220, 710, battery plate grid 210 and paste 130 may be cured in a heating oven to drive off excess moisture.

Additionally, although not illustrated, the combination may also be fed through a manufacturing station wherein, the grids may be cut into smaller grids of a desirable dimension for further processing.

Thus, based on the operations illustrated in FIGS. 1-7, it should be appreciated that the illustrated embodiments also provide for a manufacturing method for manufacturing battery plates wherein overpaste is provided in a uniform manner on both exterior sides of a manufactured battery plate grid.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected.

For example, although illustrated embodiments have been described in connection with the disposition of lead oxide paste on battery plate grids, it should be appreciated that the invention embodiments may be used in connection with disposition of various materials on different types of components during manufacture of such components. Therefore, the paste applied by a pasting machine designed in accordance with the invention embodiments may be of a type other then lead oxide. Moreover, the component upon which the paste is disposed need not be a grid or similar component; further, the components need not be provided in a continuous strip of components as described above. Therefore, the illustrated embodiments may be utilized for a variety of applications as understood by one of ordinary skill in the art.

The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A battery plate fabrication method comprising:
   providing a paste dispensing mechanism;
   providing a conveyor belt operatively proximate to the paste dispensing mechanism;
   advancing a battery plate grid past the paste dispensing mechanism on the conveyer belt;
   elevating the battery plate grid above the conveyor proximate the paste dispensing mechanism;
   dispensing paste from the paste dispensing mechanism onto the top side of the battery plate grid advanced proximate thereto; and
   extruding paste through the battery plate grid with a portion of the paste flowing through the battery plate grid to provide coverage to a bottom side thereof,
   wherein the elevating of the battery plate grid is performed using a grid support sheet positioned above the conveyer belt, wherein the grid support sheet is a thin steel sheet.

2. The battery plate fabrication method of claim 1, wherein a thickness of the grid support sheet is at least partly determinative of the amount of paste applied to a bottom exterior side of the battery plate grid.

3. The battery plate fabrication method of claim 1, wherein the grid support sheet is configured such that a supported battery plate grid is provided with a consistent layer of paste covering both exterior sides of the battery plate grid.

4. The battery plate fabrication method of claim 1, wherein the grid support sheet is configured such that, once paste is applied to a top exterior side of a battery plate grid, the grid support sheet facilitates transmission of the applied paste through to and past a bottom exterior side of the grid.

5. The battery plate fabrication method of claim 4, wherein backing paper is fed into the apparatus between a bottom side of the battery plate grid material and a top side of the conveyor belt.

6. The battery plate fabrication method of claim 5, wherein a gap is provided between the bottom side of the battery plate grid and the backing paper.

7. The battery plate fabrication method of claim 6, wherein the gap enables the extruded paste stream to flow into openings in a top side of the battery plate grid, through to the bottom side of the battery plate grid.

8. The battery plate fabrication method of claim 7, wherein the flow of the paste stream through to the bottom side of the battery plate grid causes the backing paper to become affixed to the bottom side of the battery plate grid.

9. The battery plate fabrication method of claim 1, wherein a shape of the grid support sheet prevents a battery plate grid from being jammed between the support sheet and the hopper.

10. The battery plate fabrication method of claim 1, wherein a shape of the grid support sheet assists in preventing backing paper to be applied to a bottom side of the battery plate grid from jamming on the grid support sheet.

11. The battery plate fabrication method of claim 1, wherein the grid support sheet includes a leading edge, which is slightly beveled at a downward angle.

* * * * *